United States Patent
Matteson et al.

(10) Patent No.: US 11,080,714 B2
(45) Date of Patent: Aug. 3, 2021

(54) SYSTEMS AND METHODS FOR PROVIDING STAND-IN AUTHORIZATION

(71) Applicant: MasterCard International Incorporated, Purchase, NY (US)

(72) Inventors: Robert Alexander Matteson, Chesterfield, MO (US); Brenda Renee Hopkins, Wildwood, MO (US); Johan Gerber, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 423 days.

(21) Appl. No.: 15/167,232

(22) Filed: May 27, 2016

(65) Prior Publication Data

US 2017/0345007 A1 Nov. 30, 2017

(51) Int. Cl.
*G06Q 20/40* (2012.01)
*G06Q 20/34* (2012.01)
*G06Q 20/22* (2012.01)

(52) U.S. Cl.
CPC ....... *G06Q 20/4097* (2013.01); *G06Q 20/227* (2013.01); *G06Q 20/34* (2013.01); *G06Q 20/401* (2013.01); *G06Q 20/405* (2013.01)

(58) Field of Classification Search
CPC .. G06Q 20/4097; G06Q 20/227; G06Q 20/34; G06Q 20/401; G06Q 20/405; G06Q 20/40; G06Q 20/22
See application file for complete search history.

(56) References Cited

U.S. PATENT DOCUMENTS

| | | | | |
|---|---|---|---|---|
| 5,260,986 A | * | 11/1993 | Pershan | H04M 3/533 340/7.46 |
| 5,659,724 A | * | 8/1997 | Borgida | G06F 16/288 |
| 6,430,539 B1 | * | 8/2002 | Lazarus | G06Q 30/02 705/14.1 |
| 6,999,943 B1 | * | 2/2006 | Johnson | G06Q 20/10 705/35 |
| 7,231,657 B2 | | 6/2007 | Honarvar et al. | |
| 7,383,231 B2 | | 6/2008 | Gupta et al. | |

(Continued)

OTHER PUBLICATIONS

Ekkarat Boonchieng, "Performance and Security Issue on Open Source Private Cloud," 2014, Proceedings of the International Electrical Engineering Congress 2014, pp. 1-5 (Year: 2014).*

*Primary Examiner* — Kenneth Bartley
(74) *Attorney, Agent, or Firm* — Armstrong Teasdale LLP (57) ABSTRACT

A computer-implemented method for performing a stand-in payment authorization is provided. The method is implemented using a stand-in payment authorization (SPA) computing device. The method includes storing account numbers of predesignated cardholders in an account file that are designated to receive stand-in authorization by the SPA computing device. The method also includes receiving an authorization request data signal redirected to the SPA computing device after the authorization request data signal was submitted to an unresponsive issuing bank computing device. The method further includes generating an authorization response data signal based at least upon a comparison of the account numbers stored in the account file to a candidate account number. The method further includes transmitting the authorization response data signal.

12 Claims, 8 Drawing Sheets

(56) References Cited

U.S. PATENT DOCUMENTS

| | | | |
|---|---|---|---|
| 7,657,482 B1 | 2/2010 | Shirey et al. | |
| 7,697,942 B2 | 4/2010 | Stevens | |
| 7,729,994 B2 | 6/2010 | Gupta et al. | |
| 7,828,204 B2* | 11/2010 | Fiebiger | G06Q 20/20 235/380 |
| 7,962,415 B2 | 6/2011 | Gupta et al. | |
| 7,962,419 B2 | 6/2011 | Gupta et al. | |
| 8,136,726 B2* | 3/2012 | Ferrara | G06Q 10/00 235/380 |
| 8,150,768 B2 | 4/2012 | Gupta et al. | |
| 8,150,769 B2 | 4/2012 | Gupta et al. | |
| 8,229,854 B2 | 7/2012 | Stephen et al. | |
| 8,600,873 B2 | 12/2013 | Fisher | |
| 8,639,623 B2 | 1/2014 | Kavanagh et al. | |
| 8,706,689 B1* | 4/2014 | Adam | G06Q 10/101 707/616 |
| 8,780,718 B2* | 7/2014 | Gandhewar | H04L 67/2814 370/235 |
| 9,256,870 B1* | 2/2016 | Howe | G06Q 20/382 |
| 10,540,645 B2* | 1/2020 | DeSilva | G06Q 20/10 |
| 2003/0083933 A1* | 5/2003 | McAlear | G06Q 30/02 705/14.17 |
| 2003/0105688 A1* | 6/2003 | Brown | G06Q 20/04 705/31 |
| 2003/0120554 A1* | 6/2003 | Hogan | G06Q 20/02 705/64 |
| 2003/0167207 A1* | 9/2003 | Berardi | G06Q 10/025 705/16 |
| 2003/0233334 A1* | 12/2003 | Smith | G06Q 20/04 705/75 |
| 2004/0230488 A1* | 11/2004 | Beenau | G06K 9/00 705/18 |
| 2004/0230535 A1* | 11/2004 | Binder | G06Q 20/04 705/64 |
| 2005/0154663 A1* | 7/2005 | Boyle | G06Q 20/02 705/35 |
| 2006/0242039 A1* | 10/2006 | Haggerty | G06Q 20/10 705/35 |
| 2007/0262139 A1* | 11/2007 | Fiebiger | G06Q 20/20 235/380 |
| 2008/0033880 A1* | 2/2008 | Fiebiger | G06Q 20/20 705/44 |
| 2008/0126213 A1* | 5/2008 | Robertson | G06Q 20/20 705/21 |
| 2008/0244011 A1* | 10/2008 | Cox | H04L 51/04 709/206 |
| 2009/0106141 A1* | 4/2009 | Becker | G06Q 40/025 705/38 |
| 2009/0106151 A1* | 4/2009 | Nelsen | G06Q 20/40 705/44 |
| 2009/0210299 A1* | 8/2009 | Cowen | G06Q 20/10 705/13 |
| 2009/0210427 A1* | 8/2009 | Eidler | G06F 11/1484 |
| 2009/0276344 A1* | 11/2009 | Maw | G06Q 20/04 705/30 |
| 2010/0016034 A1* | 1/2010 | Lindqvist | H02J 7/34 455/573 |
| 2010/0128598 A1* | 5/2010 | Gandhewar | H04L 67/2814 370/217 |
| 2010/0287099 A1* | 11/2010 | Liu | G06Q 20/40 705/44 |
| 2011/0112918 A1* | 5/2011 | Mestre | G06Q 20/20 705/16 |
| 2011/0125642 A1* | 5/2011 | Kamal | G06F 17/30424 705/44 |
| 2011/0166997 A1* | 7/2011 | Dixon | G06Q 20/105 705/41 |
| 2011/0178884 A1* | 7/2011 | Teicher | G06Q 20/02 705/16 |
| 2012/0005053 A1* | 1/2012 | Burgess | G06Q 30/02 705/35 |
| 2012/0036076 A1* | 2/2012 | Vanderwall | G06Q 20/28 705/75 |
| 2012/0102088 A1* | 4/2012 | Bindal | G06F 11/1461 709/203 |
| 2012/0173423 A1* | 7/2012 | Burdett | G06Q 20/3223 705/44 |
| 2013/0179281 A1* | 7/2013 | White | G06Q 20/382 705/21 |
| 2013/0197702 A1* | 8/2013 | Arvind | H02J 3/005 700/286 |
| 2013/0339247 A1* | 12/2013 | Lam | G06Q 20/4016 705/44 |
| 2013/0346170 A1* | 12/2013 | Epstein | G06Q 30/02 705/14.14 |
| 2014/0101055 A1* | 4/2014 | Grissom | G06Q 20/027 705/71 |
| 2014/0201079 A1 | 7/2014 | Kavanagh et al. | |
| 2014/0244462 A1* | 8/2014 | Maenpaa | G06Q 20/0453 705/35 |
| 2014/0304158 A1* | 10/2014 | Basu | G06Q 20/02 705/44 |
| 2014/0310176 A1* | 10/2014 | Saunders | G06Q 20/405 705/44 |
| 2014/0365361 A1* | 12/2014 | Ibasco | G06Q 20/02 705/39 |
| 2015/0199679 A1* | 7/2015 | Palanisamy | G06Q 20/34 705/67 |
| 2015/0207851 A1* | 7/2015 | Nampally | H04L 67/2809 709/217 |
| 2015/0220937 A1* | 8/2015 | Iannace | G06Q 30/0201 705/7.29 |
| 2015/0221028 A1* | 8/2015 | White | G06Q 20/34 705/39 |
| 2015/0317633 A1* | 11/2015 | Saunders | G06Q 20/409 705/44 |
| 2016/0189184 A1* | 6/2016 | Lee | G06Q 30/0205 705/7.31 |
| 2016/0342911 A1* | 11/2016 | Kannan | G06Q 10/0631 |
| 2017/0116604 A1* | 4/2017 | Lacoss-Arnold | G06Q 20/40 |
| 2017/0140378 A1* | 5/2017 | Rao | G06Q 20/405 |
| 2017/0148034 A1* | 5/2017 | Sharma | G06Q 30/0201 |
| 2017/0148081 A1* | 5/2017 | Chauhan | G06Q 30/0631 |
| 2017/0178128 A1* | 6/2017 | Fourez | G06Q 20/38 |
| 2017/0270604 A1* | 9/2017 | Abela | G06Q 40/025 |
| 2017/0336223 A1* | 11/2017 | Bakshiram | G01C 21/3617 |
| 2017/0337497 A1* | 11/2017 | Birukov | G06Q 10/06315 |

* cited by examiner

SYSTEMS AND METHODS FOR PROVIDING STAND-IN AUTHORIZATION

BACKGROUND

This disclosure relates to processing electronic signals transmitted through computer networks, and more specifically to receiving data in signals from a data network and providing stand-in authorization for a high-spending cardholder when an issuer is unable to respond to a request to authorize a financial transaction.

At least some known payment processing networks perform a payment authorization process to determine whether to authorize or decline a financial transaction initiated by a cardholder using a payment card at a merchant location. The payment authorization process is performed by a payment processor within a payment network that facilitates communication between an issuer bank and a merchant bank. More specifically, the payment processing network communicates between a merchant bank computer system and an issuer bank computer system to determine whether a financial transaction should be authorized or declined based on a status of the cardholder's account.

On occasion, the payment processor may be unable to communicate with the issuer bank computer system because it is offline, the connection times out, or the issuer bank computer system is otherwise unavailable. Because these known payment authorization processes are performed within a single payment network, rather than being distributed across multiple payment networks, if the issuer bank computer system is unable to be contacted, the payment network must decline the transaction and the cardholder is unable to purchase the desired goods or services. This especially affects high-spending cardholders who use their payment cards more than average cardholders.

Accordingly, it is desirable to have a stand-in authorization system that is configured to authorize a payment transaction when the issuer bank computing system is non-responsive to the initial authorization request, and when the cardholder initializing the transaction is a high-spending cardholder.

BRIEF DESCRIPTION OF THE DISCLOSURE

A computer-implemented method for performing a stand-in payment authorization is provided. The method is implemented using a stand-in payment authorization (SPA) computing device including a processor coupled to a memory device. The method includes storing, by the SPA computing device, account numbers of predesignated cardholders in an account file that are designated to receive stand-in authorization by the SPA computing device. The method also includes receiving, by the SPA computing device, an authorization request data signal redirected to the SPA computing device after the authorization request data signal has been submitted to an unresponsive issuing bank computing device. The authorization request data signal includes authorization request data for a transaction initiated using a payment card associated with a candidate account number. The method further includes comparing, by the SPA computing device, the account numbers stored in the account file to the candidate account number. The method also includes generating, by the SPA computing device, an authorization response data signal based at least upon the comparison of the account numbers stored in the account file to the candidate account number. The method further includes transmitting, by the SPA computing device, the authorization response data signal to at least one of a payment processor, an acquiring bank, and a merchant.

A stand-in payment authorization (SPA) computing device for performing a stand-in payment authorization is provided. The SPA computing device including a processor coupled to a memory device. The SPA computing device is configured to store, within the memory, account numbers of predesignated cardholders in an account file that are designated to receive stand-in authorization by the SPA computing device. The SPA computing device is also configured to receive an authorization request data signal redirected to the SPA computing device after the authorization request data signal has been submitted to an unresponsive issuing bank computing device. The authorization request data signal includes authorization request data for a transaction initiated using a payment card associated with a candidate account number. The SPA computing device is further configured to compare the account numbers stored in the account file to the candidate account number. The SPA computing device is also configured to generate an authorization response data signal based at least upon the comparison of the account numbers stored in the account file to the candidate account number. The SPA computing device is configured to transmit the authorization response data signal to at least one of a payment processor, an acquiring bank, and a merchant.

A non-transitory computer-readable storage medium having computer-executable instructions embodied thereon executed by a stand-in payment authorization (SPA) computing device having at least one processor coupled to a memory is provided. The computer-executable instructions cause the SPA computing device to store, within the memory, account numbers of predesignated cardholders in an account file that are designated to receive stand-in authorization by the SPA computing device. The computer-executable instructions also cause the SPA computing device to receive an authorization request data signal redirected to the SPA computing device after the authorization request data signal has been submitted to an unresponsive issuing bank computing device. The authorization request data signal including authorization request data for a transaction initiated using a payment card associated with a candidate account number. The computer-executable instructions further cause the SPA computing device to compare the account numbers stored in the account file to the candidate account number. The computer-executable instructions also cause the SPA computing device to generate an authorization response data signal based at least upon the comparison of the account numbers stored in the account file to the candidate account number. The computer-executable instructions further cause the SPA computing device to transmit the authorization response data signal to at least one of a payment processor, an acquiring bank, and a merchant.

BRIEF DESCRIPTION OF THE DRAWINGS

FIGS. 1-8 show example embodiments of the methods and systems described herein.

DETAILED DESCRIPTION OF THE DISCLOSURE

A system and method for providing stand-in authorization for high-spending cardholders is provided. The system includes a stand-in payment authorization (SPA) computing device that includes a processor coupled to a memory device and a data analyzer (DA) module coupled to an account management (AM) module. The DA module is also coupled to a data warehouse that stores transaction data, including primary account numbers (PANs), also known as personal account identifiers, and transaction amounts. The DA module is configured to generate a list of PANs of high-spending cardholders for each issuer using the transaction data stored in the data warehouse. The DA module is configured to transmit the list to the AM module. The AM module is configured to enroll the high-spending cardholders included within the list in a premium cardholder service. When an issuer is unable to respond to a request to authorize a financial transaction, the AM module provides stand-in authorization for cardholders enrolled in the premium cardholder service (also known as predesignated cardholders).

In the example embodiment, the DA module is configured to conduct periodic data analysis of the transaction data stored in the data warehouse to identify high-spending cardholders for a particular issuer. The periodic data analysis occurs on a daily, monthly, and/or yearly basis. The DA module uses a long-term variable (LTV) that measures total spending amounts for each PAN over a predefined period of time (e.g., a 12 month period). In some embodiments, the LTV also applies a weighted factor, such that additional weight is applied to more recent high-spending transactions and less weight is applied to older high-spending transactions. The DA module ranks the PANs by total spending amounts to identify high-spending cardholders. In the example embodiment, high-spending cardholders are defined as a predefined percentage of the highest spending cardholders globally. For example, in one embodiment, high-spending cardholders are the top 2% of the highest spending cardholders globally. The DA module adds the PANs of the high-spending cardholders to one or more premium list files.

The DA module includes within the premium list file a monetary limit associated with each PAN. The AM module, which performs the stand-in authorization, approves a transaction for a PAN if a transaction amount is equal to or less than the monetary limit associated with the PAN. In one embodiment, the default monetary limit for each listed PAN is $10,000. However, an issuer has the ability to change the default monetary limit and/or an individual PAN monetary limit to an amount deemed appropriate by the issuer.

The DA module is configured to transmit the premium list file to the AM module. The AM module is configured to receive the premium list file and add the PANs and monetary limits in the premium list file to one or more stand-in account files. The stand-in account file is a separate file that includes the PANs enrolled in the premium cardholder service. The AM module stores the stand-in account file in the memory device coupled to the AM module. In one embodiment, an issuer has its own stand-in account file that includes PANs associated with the issuer. In an alternative embodiment, there is one stand-in account file that includes PANs for all issuers.

When adding a PAN to the stand-in account file, the AM module automatically sets a predefined purge date for the PAN. For example, in one embodiment, the AM module sets the purge date for 365 days after the PAN is added to the stand-in account file. The AM module automatically removes the PAN from the stand-in account file on the purge date, whereupon the PAN is no longer enrolled in the premium cardholder service.

In one embodiment, when adding a PAN listed in the premium list file to the stand-in account file, the AM module is configured to scan the stand-in account file for the PAN to avoid relisting PANs already enrolled in the premium cardholder service. In another embodiment, if a PAN is already listed in the stand-in account file, the AM module is configured to update the purge date for the PAN. For example, the AM module will reset the purge date for another 365 days. Otherwise, the AM module purges the PAN after a predefined period of time (e.g., 365 days) has passed since the PAN was added to the stand-in account file.

An issuer is able to opt-out one or more PANs from the premium cardholder service. In one embodiment, the opted-out PANs are listed in a separate opt-out file and stored in memory coupled to the AM module. When adding a PAN listed in the premium list file to the stand-in account file, the AM module is configured to scan the opt-out file for the PAN. If the PAN is listed in the opt-out file, the AM module does not list the PAN in the stand-in account file. In another embodiment, the opted-out PANs are listed in the stand-in account file but are marked as opted out and do not receive stand-in authorization by the AM module. In addition, an issuer is able to opt out of the premium cardholder service. In some embodiments, issuers that have opted out are stored in memory and PANs associated with the issuers will not be added to the premium list file and/or the stand-in account file.

If an issuer opts-out after the one or more PANs have already been listed in the stand-in account file, the PAN will remain until the purge date is met or the issuer can remove the PAN on their own. The AM module will not provide stand-in authorization for a PAN that has been opted-out of the premium cardholder service. In one embodiment, the issuer bank computing device is able to communicate with the SPA computing device, and is able to add and/or remove PANs stored within the AM module, and more specifically from the stand in account file.

The SPA computing device, and more particular the AM module, is coupled to a payment network. The AM module is further configured to receive an authorization request data signal from the payment network requesting authorization for a financial transaction when the issuer device is determined to be down (for example, the issuer device returns a busy signal or times out). The authorization request data signal includes authorization data for a transaction that has been processed by a merchant. The authorization data includes at least a candidate PAN associated with a payment card used in the transaction and a transaction amount. In some embodiments, the AM module is further configured to receive a flag indicating that the payment network has requested that the AM module perform a stand-in authorization process on behalf of an unavailable issuer.

The SPA computing device determines whether to authorize or decline a stand-in transaction on behalf of an unavailable issuer. In some embodiments, the SPA computing device identifies the unavailable issuer associated with the transaction. Based on that identification, the AM module retrieves from memory a stand-in account file for the issuer. In alternative embodiments, all issuers are listed in one stand-in account file.

The AM module reviews the stand-in account file for a PAN matching a candidate PAN included in the authorization data. In one embodiment, the data from the stand-in account file is stored in a high-speed storage device (i.e., a cache) for faster searching. If a matching PAN is found, the AM module then determines whether the transaction amount exceeds a predefined monetary limit associated with the PAN. If the transaction amount is under the predefined monetary limit, the AM module generates an authorization response data signal that includes authorization response data indicating that the transaction is authorized. The AM module transmits the authorization response data signal to the payment network.

If a matching PAN is found but the transaction amount exceeds the predefined monetary limit associated with the PAN, the AM module generates an authorization response data signal indicating that the transaction is declined. The AM module transmits the authorization response data signal to the payment network. In one embodiment, the AM module also generates a response code indicating a reason for the decline that is transmitted with the authorization response data signal.

The authorization response data signal causes a point-of-sale (POS) device to authorize or decline the transaction.

The technical effect achieved by the systems and methods described herein is increasing a speed that a transaction is authorized by a network when an issuer computing device is unavailable to provide the normal authorization. In addition, by ensuring that high-spending cardholders receive approvals for transactions when the issuer is unable to respond, the amount of mistakenly declined transactions is decreased. This produces more accurate data processing and less network traffic from declined transactions. In addition, issuers are able to obtain the PANs of their highest spenders, which is valuable information. The systems and methods described herein further provide the technical advantage of enabling a first processing network to offload data-processing functions to a second processing network that is communicatively coupled to the second processing network.

By ensuring an issuer's highest spenders always receive an approval when the issuer is unable to respond, the issuer retains that cardholder's business. According to a recent market survey, 4 out of 10 cardholders abandon their card after a transaction is mistakenly declined and affluent cardholders use their card more than 2 times more than average cardholders. In addition to preserving the issuer's important customers, the issuer is able to leverage the Stand-In Account File to see the personal account numbers (PANS) of their highest spenders. This is valuable information to the issuers as they have expressed the difficulty in identifying their highest spenders on their own. Issuers will be able to move these highest spenders, many of which are in mid-tier card programs, into a more appropriate product with interchange benefits.

The methods and systems described herein may be implemented using computer programming or engineering techniques including computer software, firmware, hardware or any combination or subset thereof, wherein the technical effect is achieved by performing at least one of: (a) preparing a premium list file that includes high-spending cardholders; (b) preparing a stand-in account file that includes high-spending cardholders enrolled in a premium cardholder service; (c) receiving an authorization data signal from a payment network, the authorization data signal including authorization data for a transaction that has been processed by the payment network, wherein the authorization data includes at least a candidate PAN and a transaction amount; (d) reviewing the stand-in account file to determine if the candidate PAN is enrolled in the premium cardholder service; (e) reviewing the stand-in account file to determine if the transaction amount exceeds a monetary limit; (f) generating an authorization response data signal, wherein the authorization response data indicates whether the transaction is authorized or declined; and (g) transmitting the authorization response data signal to the payment network.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, smartphones, personal digital assistants (PDAs), key fobs, and/or computers. Each type of transaction card can be used as a method of payment for performing a transaction.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
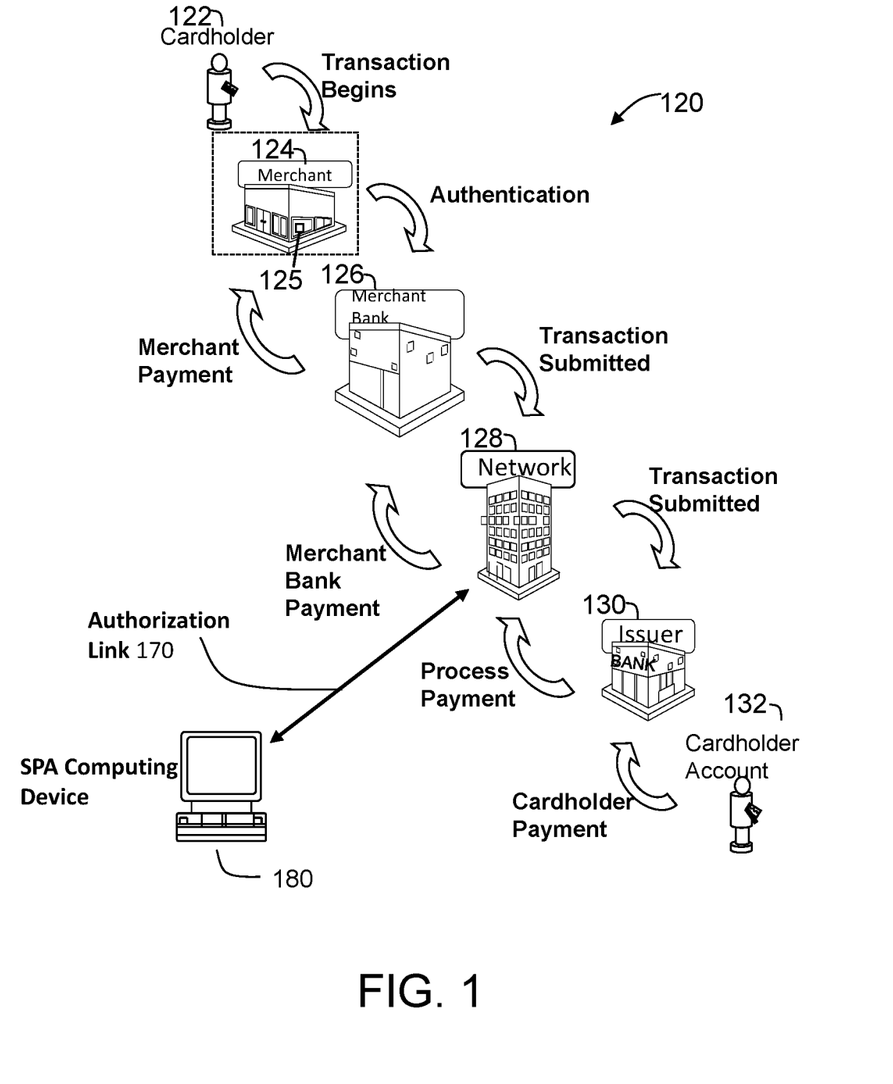
FIG. 1 is a schematic diagram illustrating a stand-in payment authorization (SPA) platform that may authorize a payment transaction when the issuer bank computing device is unresponsive.

FIG. 1 is a schematic diagram illustrating a stand-in payment authorization (SPA) platform 120 that may authorize a payment transaction when the issuer bank computing device is unresponsive. The present disclosure involves a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In SPA platform 120, a financial institution, such as an issuer 130, issues a payment account card, such as a credit card account or a debit card account, to a cardholder 122, who uses the payment account card to tender payment for a purchase from a merchant 124. To accept payment with the payment account card, merchant 124 must normally establish an account with a financial institution that is part of the financial payment system. This financial institution is usually called the "merchant bank" or the "acquiring bank" or "acquirer bank" or simply "acquirer". When cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe on the payment account card or EMV chip and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor." In some instances, a merchant (e.g., merchant 124) stores payment card information associated with a cardholder (e.g., cardholder 122) and requests authorization from acquirer 126 using the stored payment card information, rather than reading the cardholder's account information from the payment card itself (i.e., a card-on-file (COF) transaction).

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is cleared and settled between merchant 124, acquirer 126, and issuer 130. Clearing refers to the communication of financial data for reconciliation purposes between the parties. Settlement refers to the transfer of funds between the merchant's account, acquirer 126, and issuer 130 related to the transaction.

In some implementations, issuer 130 may fail to respond to the authorization request. For example, the computers of issuer 130 may have a systematic malfunction or a connection to issuer 130 may be unavailable. In such implementations, a request is transmitted through a payment authorization link 170 to a stand-in payment authorization (SPA) computing device 180 to request stand-in processing for a transaction. SPA computing device 180 makes a decision on behalf of the authorization entity whether to approve the transaction so that a timely authorization response may be provided to the merchant computer for the transaction.

The enhancement described herein enables payment authorization link to receive electronic data signals from payment network 128, thereby enabling processing functions to be distributed across two networks. More specifically, and as described in more detail herein, SPA computing device 180 coupled to payment authorization link 170 receives authorization data signals (including authorization data for a transaction) transmitted from payment authorization link 170. SPA computing device 180 determines whether a PAN included within the authorization data is in the premium list file stored in memory and if so, whether a transaction amount for the transaction exceeds the predefined monetary limit for the payment card. If the PAN is listed in the premium list file and the transaction amount does not exceed the predefined monetary limit, SPA computing device 180 stands-in for an unavailable issuer 130 and authorizes the transaction represented in the authorization data. If the PAN is not listed or the transaction amount exceeds the predefined monetary limit, SPA computing device 180 generates one or more error codes specifying why SPA computing device 180 will not authorize the corresponding transaction.

SPA computing device 180 generates an authorization response data signal, which includes authorization response data indicating whether the transaction is authorized or declined. SPA computing device 180 then transmits the authorization response data signal through payment authorization link 170 to payment network 128.

Figure 2:
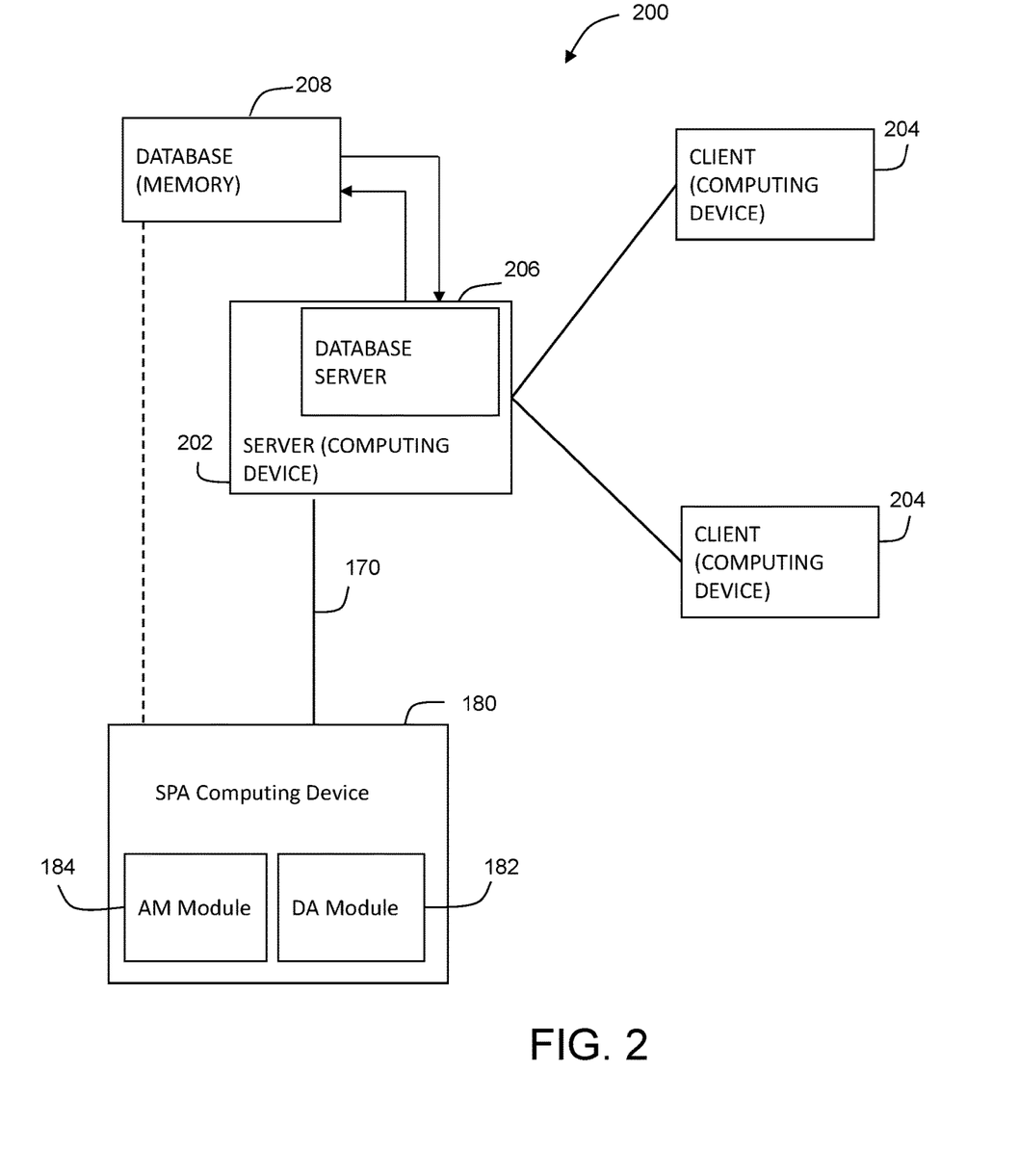
FIG. 2 is a simplified block diagram of an example SPA platform as shown in FIG. 1.

FIG. 2 is a simplified block diagram of an example stand-in payment authorization platform 200 in accordance with one embodiment of the present disclosure. In the example embodiment, system 200 includes a payment processing server computing device 202, a plurality of client subsystems 204 (also referred to as client systems or client computing devices) connected to payment processing server computing device 202, and SPA computing device 180 (shown in FIG. 1). SPA computing device 180 includes DA module 182 and AM module 184. In one embodiment, payment processing server computing device 202 is accessible to client systems 204 using the Internet. Client systems 204 are interconnected to the Internet through many interfaces including a network, such as a local area network (LAN) and/or a wide area network (WAN), dial-in connections, cable modems, wireless-connections, and special high-speed ISDN lines. Client systems 204 may be any device capable of interconnecting to the Internet including a point-of-sale (POS) device, a $3^{rd}$ party payment network computing device, a cardholder computing device (e.g., a smartphone, a tablet, or other computing device), or any other computing device capable of communicating with payment processing server computing device 202.

A database server 206 is connected to a database 208 containing information on a variety of matters, as described below in greater detail. In one embodiment, database 208 is stored on payment processing server computing device 202 and may be accessed by client systems 204 or SPA computing device 180 using payment processing server computing device 202. In an alternative embodiment, database 208 is stored remotely from payment processing server computing device 202 and may be non-centralized. In such an embodiment, SPA computing device 180 can access database 208 directly.

Figure 3:
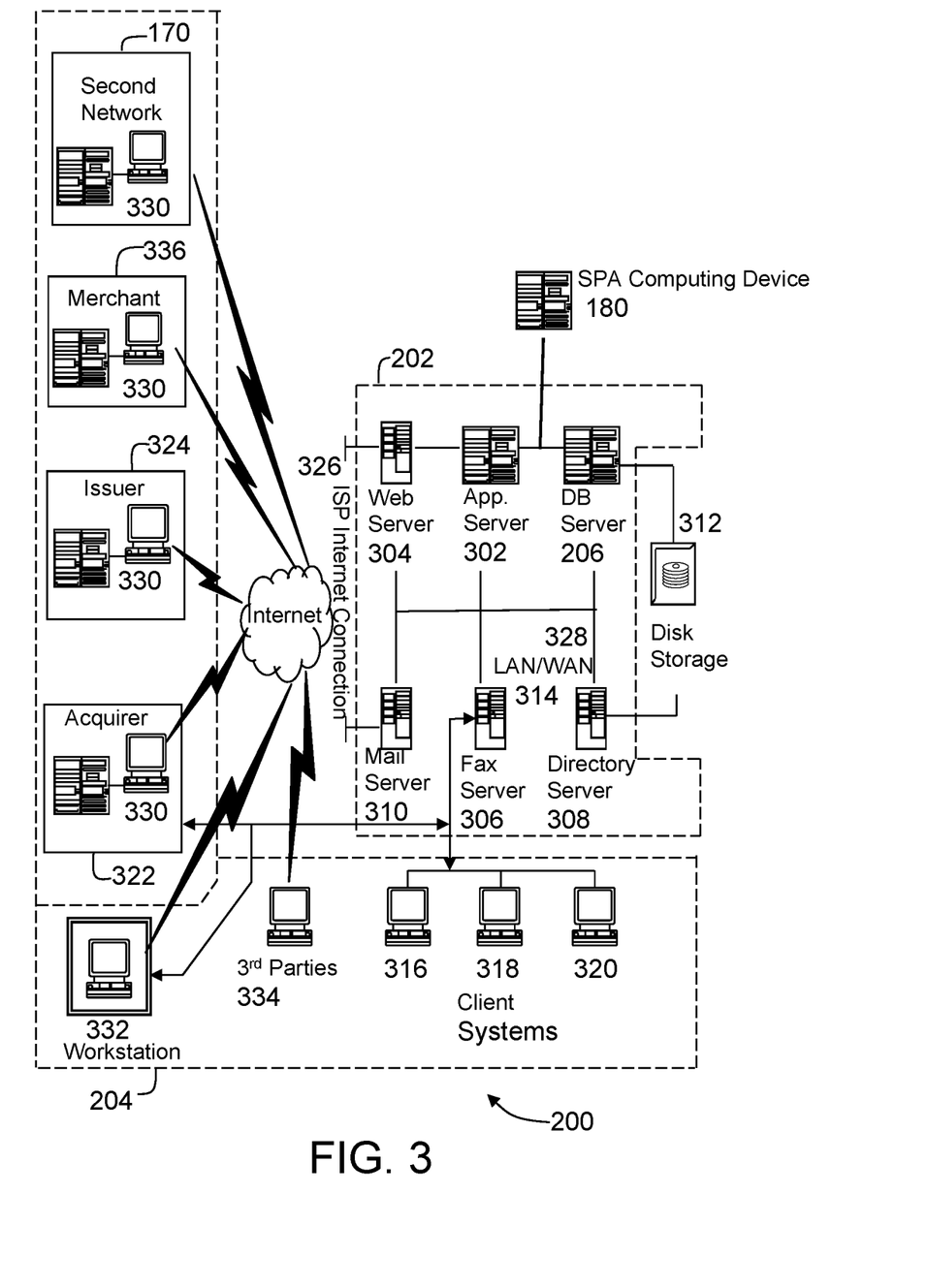
FIG. 3 is an expanded block diagram of a server architecture of the payment processing system shown in FIG. 2, including the plurality of computing devices in accordance with one example embodiment of the present disclosure.

FIG. 3 is an expanded block diagram of an example embodiment of a server architecture of payment processing system 200 in accordance with one embodiment of the present disclosure. Payment processing system 200 includes payment processing server computing device 202, client systems 204, and SPA computing device 180 (shown in FIGS. 1 and 2). Payment processing server computing device 202 includes database server 206, an application server 302, a web server 304, a fax server 306, a directory server 308, and a mail server 310. A disk storage unit 312 is coupled to database server 206 and directory server 308. Servers 206, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet. In some embodiments, SPA computing device 180 is remote from payment processing server computing device 202, but is communicatively coupled thereto. In other embodiments, SPA computing device 180 is incorporated into payment processing server computing device 202.

Each workstation, 316, 318, and 320, is a personal computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

Payment processing server computing device 202 is configured to be communicatively coupled to various entities, including acquirers 322 and issuers 324, and to third parties 334 (e.g., auditors) using an Internet connection 326. Server system 202 is also communicatively coupled with one or more merchants 336. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328.

In the example embodiment, any authorized individual or entity having a workstation 330 may access system 200. At least one of the client systems includes a manager workstation 332 located at a remote location. Workstations 330 and 332 include personal computers having a web browser. Furthermore, fax server 306 communicates with remotely located client systems, including a client system 332, using a telephone link. Fax server 306 is configured to communicate with other client systems 316, 318, and 320 as well.

Figure 4:
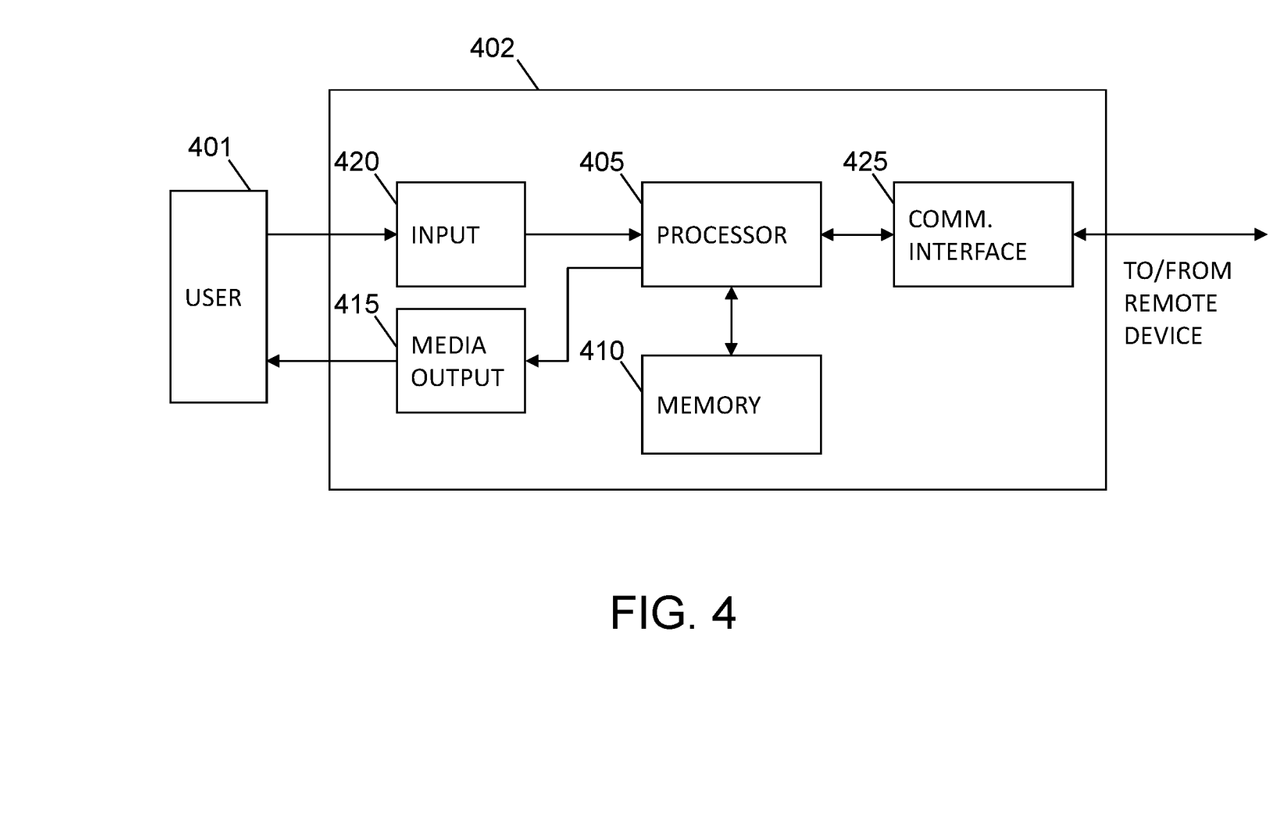
FIG. 4 illustrates a configuration of a client system shown in FIGS. 2 and 3 in accordance with one example embodiment of the present disclosure.

FIG. 4 illustrates an example configuration of a client computing device 402. Client computing device 402 may include, but is not limited to, client systems ("client computing devices") 204, 316, 318, and 320, workstation 330, manager workstation 332, and third party computing devices 334 (shown in FIG. 3).

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 122). Media output component 415 is any component capable of conveying information to user 401. In some embodiments, media output component 415 includes an output adapter such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Client computing device 402 may also include a communication interface 425, which is communicatively coupleable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website from a web server associated with a merchant. A client application allows users 401 to interact with a server application associated with, for example, a merchant.

Figure 5:
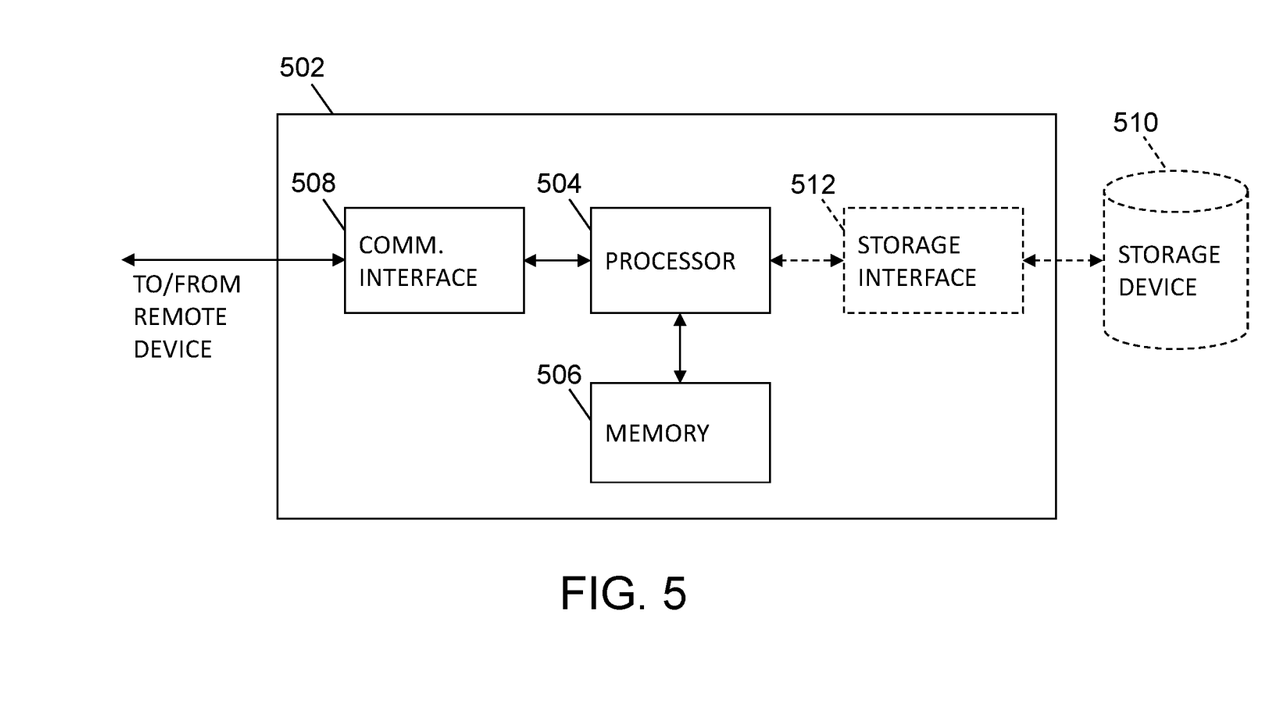
FIG. 5 illustrates a configuration of a server system shown in FIGS. 2 and 3 in accordance with one example embodiment of the present disclosure.

FIG. 5 illustrates an example configuration of a server computing device 502. Server computing device 502 is representative of payment processing server computing device 202 (shown in FIGS. 2 and 3), database server 206, application server 302, web server 304, fax server 306, directory server 308, mail server 310, and SPA computing device 180.

Server computing device 502 includes a processor 504 for executing instructions. Instructions may be stored in a memory area 506, for example. Processor 504 may include one or more processing units (e.g., in a multi-core configuration).

Processor 504 is operatively coupled to a communication interface 508 such that server computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in server computing device 502. For example, server computing device 502 may include one or more hard disk drives as storage device 510. In other embodiments, storage device 510 is external to server computing device 502 and may be accessed by a plurality of server computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
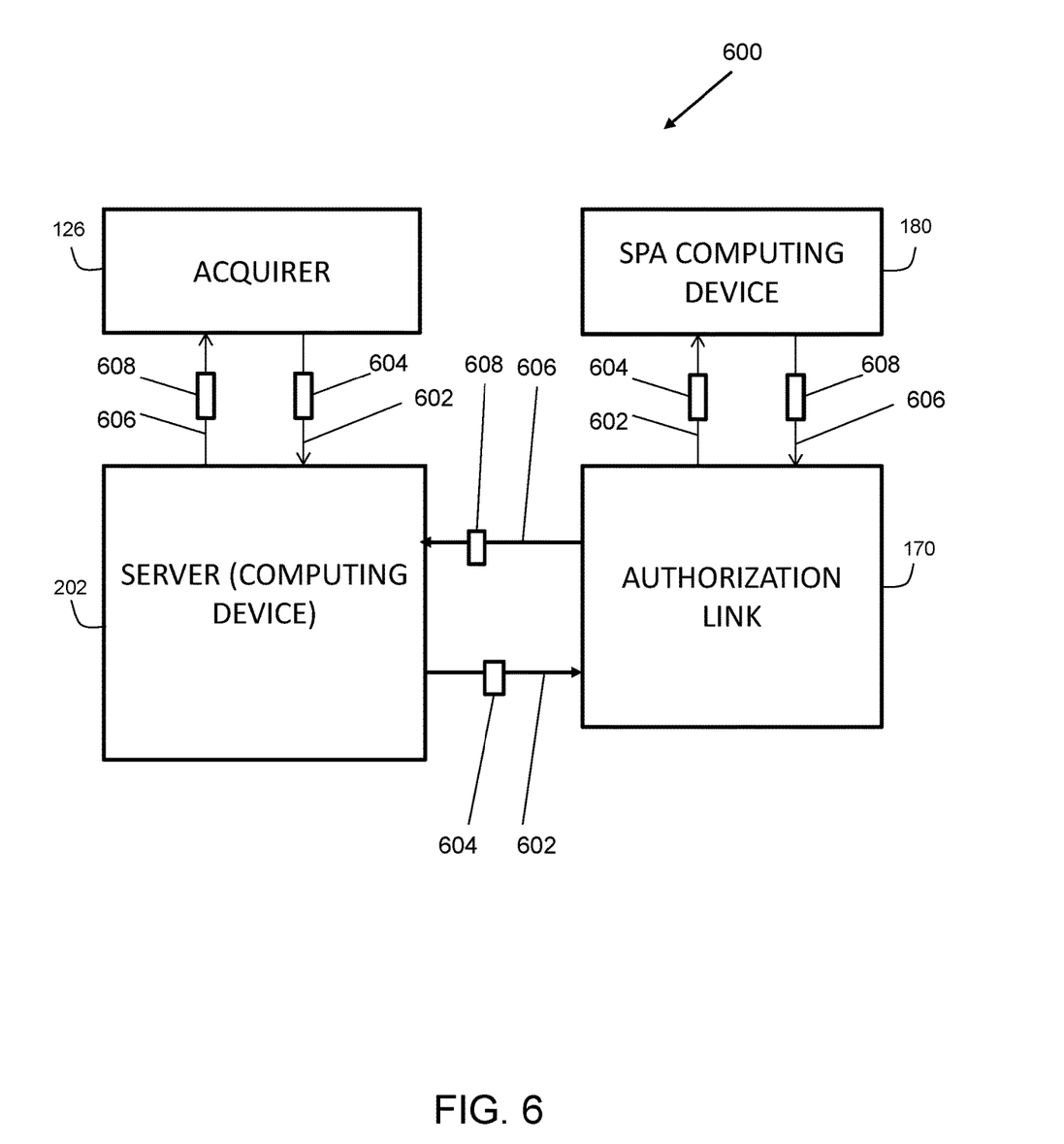
FIG. 6 is a diagram of electronic data signals received and transmitted among the payment network and the SPA computing device, as shown in FIGS. 1-3 in accordance with one example embodiment of the present disclosure.

FIG. 6 is a diagram 600 of electronic data signals received and transmitted among acquirer 126, payment processing server computing device 202, payment authorization link 170, and SPA computing device 180. In the example embodiment, when payment processing server computing device 202 is processing a transaction and an issuer of the payment card used to initiate the transaction fails to respond to an authorization data signal transmitted by payment processing server computing device 202, stand-in authorization by SPA computing device 180 is requested. The issuer may be unavailable because, for example, the issuer's computers have a systematic malfunction or a connection to the issuer is unavailable. In such embodiments, payment processing server computing device 202 transmits a request through payment authorization link 170 to SPA computing device 180 to perform stand-in authorization on behalf of the unavailable issuer so that a timely authorization response may be provided for the transaction.

More specifically, in the example embodiment, acquirer 126 transmits an authorization data signal 602 to payment processing server computing device 202. Authorization data signal 602 includes authorization data 604, representing a transaction. More specifically, authorization data 604 includes data regarding financial transactions made, for example, between merchants and cardholders, as described above with reference to FIG. 1.

Payment processing server computing device 202 transmits authorization data signal 602, including authorization data 604, to SPA computing device 180 for analysis. As described above, in the example embodiment, SPA computing device 180 is separate from and communicatively coupled via payment authorization link 170 to payment processing server computing device 202. In other embodiments, SPA computing device 180 is incorporated into payment processing server computing device 202.

SPA computing device 180 compares PANs listed in a stand-in account file with a PAN included in authorization data 604, as described in more detail with reference to FIGS. 1 and 2. SPA computing device 180 generates an authorization response data signal 606 that includes authorization response data 608. Authorization response data 608 includes, but is not limited to, data whether the transaction is authorized or declined by SPA computing device 180. In some implementations, SPA computing device 180 transmits authorization response data signal 606 through payment authorization link 170 to payment processing server computing device 202, which in turn, transmits authorization response data signal 606 through a payment network, such as payment network 128 (not shown), to acquirer 126. In other embodiments, SPA computing device 180 transmits authorization response data signal 606 directly to the payment network.

In the example embodiment, as part of authorization response data 608, SPA computing device 180 is further configured to generate advice data including a response code and a reason code. The response code indicates an authorization or a decline of the transaction by SPA computing device 180. The reason code indicates a reason for the decline when the transaction is declined. SPA computing device 180 transmits the advice data as part of authorization response data signal 604. For example, if SPA computing device 180 declines a transaction because a transaction amount exceed a monetary limit, the advice data would include a response code indicating that the transaction was declined and a reason code indicating that it was declined because of the monetary limit. In some embodiments, the response code may further indicate whether any additional services were performed. If services were performed, the reason code indicates which services were performed (i.e., fraud risk service, chip validation, AAC validation, dynamic CVC1 validation, PIN validation, etc.)

The payment network receives authorization response data signal 604, including the advice data, and transmits an authorization data signal 606 to acquirer 126 indicating whether the transaction is approved or declined. Acquirer 126 forwards authorization data signal 606 to a merchant, such as merchant 124 (not shown), where the transaction is either completed or cancelled.

In some embodiments, once payment processing server computing device 202 is able to make contact with an issuer, such as issuer 130 (not shown), payment processing server computing device 202 transmits a stand-in transaction data signal to the issuer. The stand-in transaction data signal includes stand-in transaction data for the stand-in authorization performed on the transaction. The stand-in transaction data includes the transaction details, the authorization response, and the advice data including the response code and the reason code. The issuer uses the stand-in transaction data to update a cardholder's account, such as cardholder's account 132 (not shown).

Figure 7:
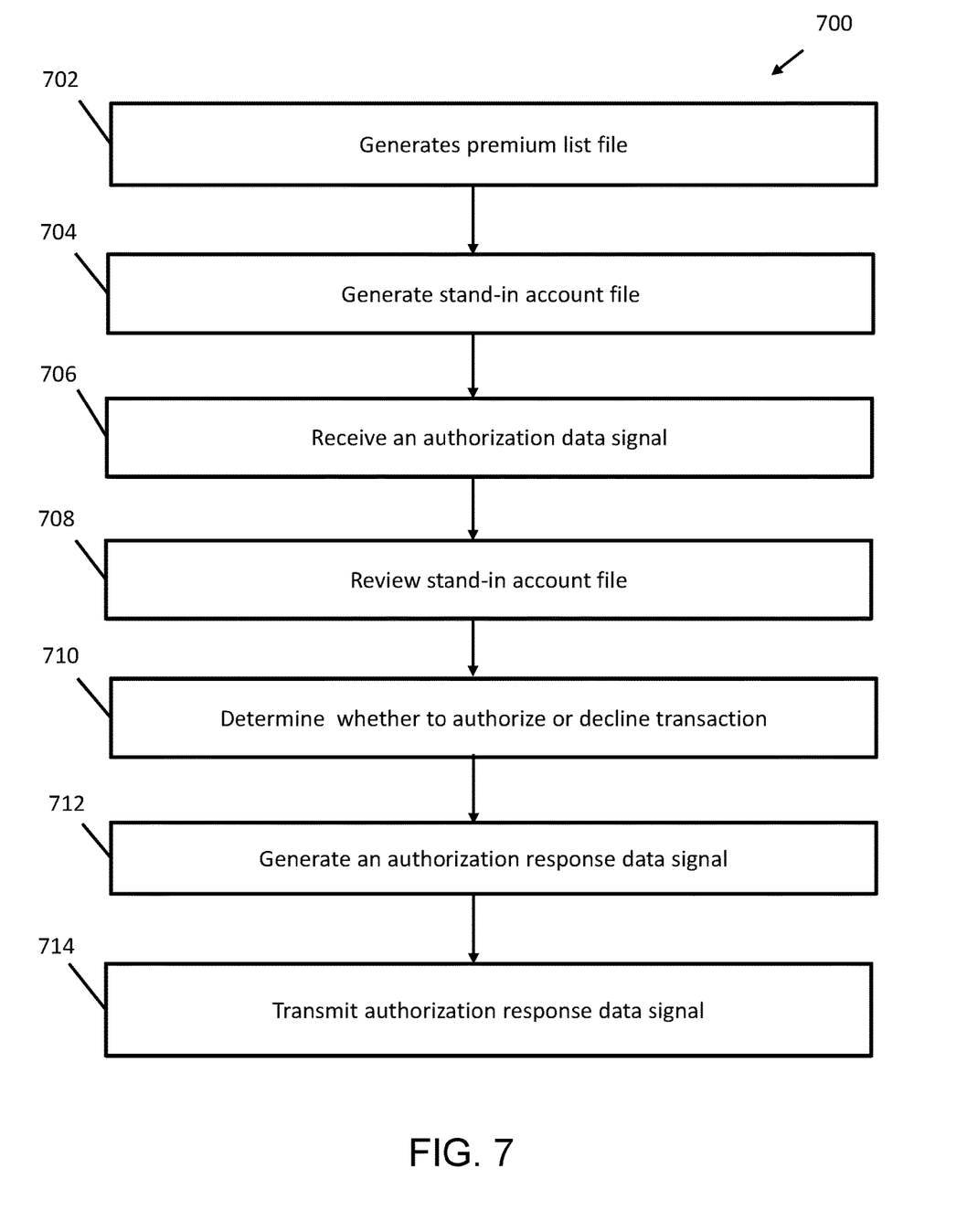
FIG. 7 is a flowchart of an example method of providing stand-in payment authorization implemented by the SPA computing device shown in FIGS. 1-3, 5, and 6 in accordance with one example embodiment of the present disclosure.

FIG. 7 is a flowchart of an example method 700 for providing stand-in authorization using the SPA computing device described in FIG. 1-2. A SPA computing device (e.g., SPA computing device 180) generates 702 one or more premium list files that include PANs (personal account numbers) of high-spending cardholders, as described above. The SPA computing device then generates 704 one or more stand-in account files that include PANs of high-spending cardholders enrolled in a premium cardholder service, as described above.

Initially, a payment network (e.g., payment network 128) is unable to contact an issuer bank computer system during processing of a transaction and requests the SPA computing device to perform stand-in authorization of the transaction. The SPA computing device receives 706 an authorization data signal (e.g., authorization data signal 602) from the payment network via a payment authorization link (e.g., payment authorization link 170). The authorization data signal includes authorization data (e.g., authorization data 604) for the transaction. The authorization data includes at least a transaction amount for the transaction and a candidate PAN associated with a payment card used to initiate the transaction. The SPA computing device reviews the authorization data for the candidate PAN and the transaction amount. In some implementations, the authorization data further includes a flag indicating that the payment network has requested stand-in authorization on behalf of the unavailable issuer bank computer system.

In some embodiments, the SPA computing device retrieves from memory the stand-in account file. The SPA computing device reviews 708 the stand-in account file for the candidate PAN and a monetary transaction limit associated with the candidate PAN. In particular, the SPA computing device compares the candidate PAN to PANs included within the stand-in account file. The SPA computing device further compares the transaction amount to the monetary transaction limit. The SPA computing device determines 710 whether to authorize the transaction by determining whether the candidate PAN is included within the stand-in account file and whether the transaction amount is under the monetary transaction limit associated with the candidate PAN.

The SPA computing device generates 712 an authorization response data signal (e.g., authorization response data signal 606) including authorization response data (e.g., authorization response data 608) indicating whether the SPA computing device authorizes or declines the transaction. The SPA computing device transmits 714 the authorization response data signal through the payment authorization link to the payment network.

Figure 8:
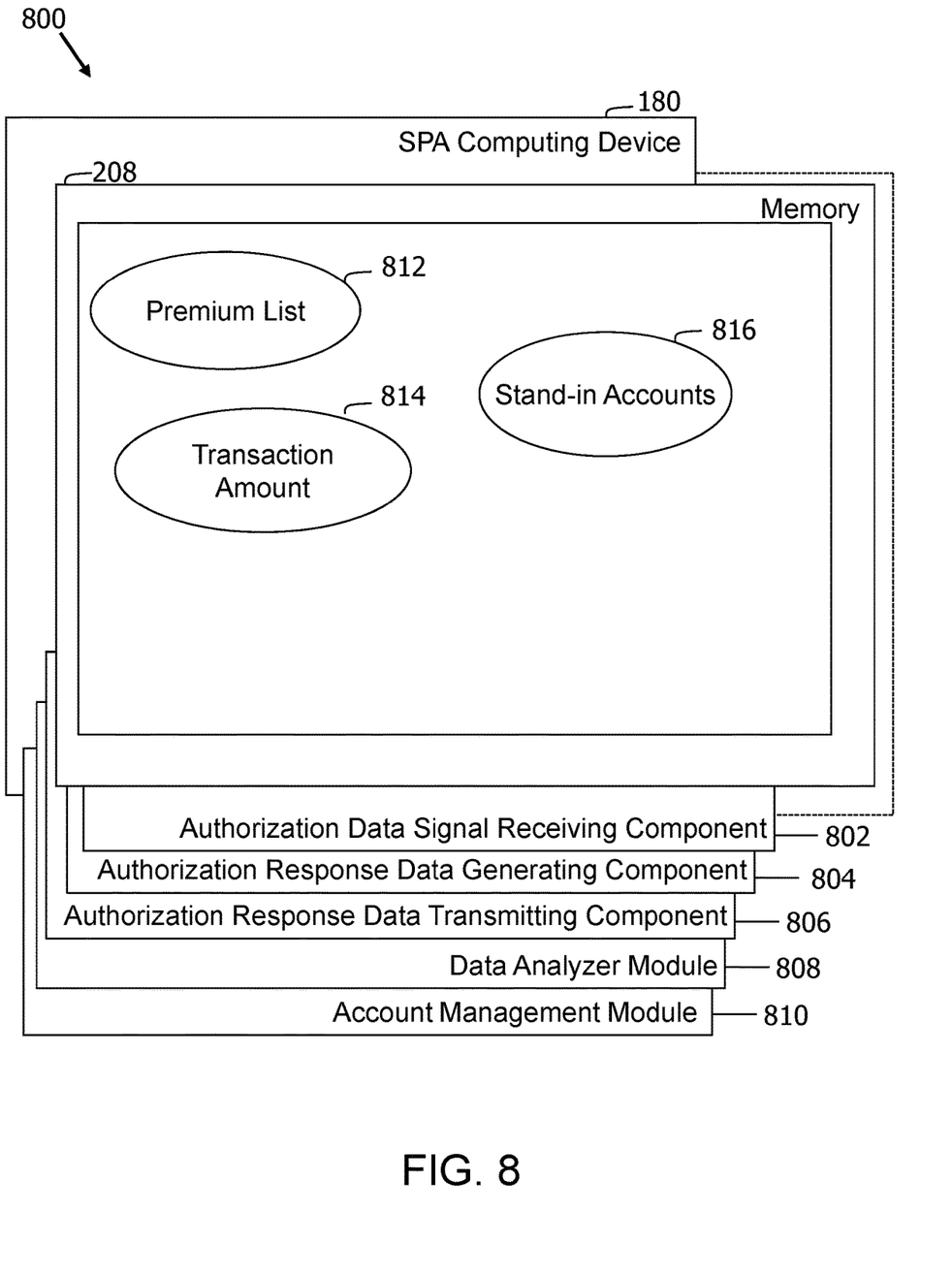
FIG. 8 is a diagram of components of the SPA computing device shown in FIGS. 1-3, 5, and 6 in accordance with one example embodiment of the present disclosure.

FIG. 8 is a diagram 800 of components of SPA computing device 180, as described in FIGS. 1-3 and 4-7. FIG. 8 further shows a configuration of data in database 208. Database 208 is in communication with several separate components within SPA computing device 180, which perform specific tasks.

SPA computing device 180 includes an authorization data signal receiving component 802 that receives an authorization data signal from the payment network. The authorization data signal includes authorization data for a transaction that has been processed by the payment network. Additionally, SPA computing device 180 includes an authorization response data generating component 804 that generates an authorization response data signal that includes authorization response data. The authorization response data indicates whether the reviewing network authorizes or declines the transaction included in the authorization data. Further, SPA computing device 180 includes an authorization response data transmitting component 806 that transmits the authorization response data signal to the payment network. SPA computing device 180 also includes a DA (data analyzer) module 808 and an AM (account management) module 810, as described above.

In an example embodiment, data in database 208 is divided into a plurality of sections, including but not limited to, a premium list file section 812, an authorization data section 814, and a stand-in accounts section 816. These sections stored in database 208 are interconnected to retrieve and store information in accordance with the functions and processes described above.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for performing a stand-in payment authorization, the method implemented using a stand-in payment authorization (SPA) computing device including at least one processor coupled to a memory device and in communication with a payment interchange network and a plurality of issuers, said method comprising:
    executing, by the at least one processor, an account management (AM) module and a data analyzer (DA) module coupled to the AM module;
    retrieving, by the DA module on a periodic basis from a data warehouse, transaction data from completed transactions previously processed over the payment interchange network, the transaction data including a plurality of account numbers for payment cards issued by the plurality of issuers;
    calculating, by the DA module on a periodic basis, a long-term variable measuring total spending amounts for each account number of the plurality of account numbers over a predefined period of time, wherein amounts associated with a first group of the completed transactions are weighed more heavily than amounts associated with a second group of the completed transactions in calculating the long-term variable, and wherein the first group of the completed transactions were completed more recently than the second group of the completed transactions;
    identifying, by the DA module on the periodic basis, a set of account numbers of the plurality of account numbers for which the long-term variable is within a top percentile;
    transmitting, by the DA module on the periodic basis, a list of the set of account numbers to the AM module;
    storing, by the AM module within the memory device, the set of account numbers in an account file designated to receive stand-in authorization by the SPA computing device, thereby enrolling the set of account numbers in a premium cardholder service;
    automatically setting, by the AM module, a predefined purge date for each account number of the set of account numbers, the predefined purge date being a predefined time period after addition of the account number to the account file;
    automatically purging, by the AM module from the account file, at least one of the set of account numbers in response to arrival of the corresponding predefined purge date, thereby unenrolling the at least one of the set of account numbers from the premium cardholder service;
    receiving, by the AM module from the payment interchange network, a plurality of authorization request data signals redirected by the payment interchange network to the SPA computing device after the plurality of authorization request data signals have been submitted to an issuing bank computing device that was unresponsive to the plurality of authorization request data signals, the issuing bank computing device associated with an issuer of the plurality of issuers, each of the plurality of authorization request data signals including an authorization request data for a current transaction initiated using a payment card associated with a candidate account number;
    comparing, by the AM module, the set of account numbers stored in the account file to each of the candidate account numbers included in the plurality of authorization request data signals;
    in response to matching a first candidate account number included in one of the plurality of authorization request data signals to one of the set of account numbers stored in the account file, generating, by the AM module, a first authorization response data signal authorizing a first current transaction associated with the first candidate account number;
    in response to a failure to match a second candidate account number included in one of the plurality of authorization request data signals to one of the set of account numbers stored in the account file, generating, by the AM module, a second authorization response data signal declining a second current transaction associated with the second candidate account number; and
    transmitting, by the AM module while the issuing bank computing device is unresponsive, the first authorization response data signal and the second authorization response data signal via the payment interchange network to at least one of at least one acquiring bank computing device and at least one merchant computing device, wherein the first authorization response data signal causes the at least one merchant computing device to authorize the first current transaction, and wherein the second authorization response data signal causes the at least one merchant computing device to decline the second current transaction.

2. The method of claim 1, said method further comprising:
    ranking, by the DA module on the periodic basis, the plurality of account numbers by a value of the long-term variable to identify the top percentile.

3. The method of claim 1, wherein each of the plurality of authorization request data signals includes a monetary amount for each corresponding current transaction, said method further comprising:
    storing, in the account file, a transaction limit amount associated with each account number of the set of account numbers;
    retrieving, from the account file, a transaction limit amount associated with the first candidate account number;
    comparing, by the AM module, the monetary amount with the transaction limit amount; and
    generating, by the AM module, the first authorization response data signal to authorize the first current transaction further in response to the monetary amount being equal to or less than the transaction limit amount.

4. The method of claim 1, further comprising:
    generating, by the AM module, a response code indicating a reason for authorizing of the first current transaction by the SPA computing device; and
    transmitting, by the AM module, the response code to the payment interchange network with the first authorization response data signal.

5. A system including a payment interchange network and a stand-in payment authorization (SPA) computing device for performing a stand-in payment authorization, said SPA computing device including at least one processor coupled to a memory device and in communication with the payment interchange network and a plurality of issuers, said system configured to:

execute, by the at least one processor, an account management (AM) module and a data analyzer (DA) module coupled to the AM module;

retrieve, by the DA module on a periodic basis from a data warehouse, transaction data from completed transactions previously processed over the payment interchange network, the transaction data including a plurality of account numbers for payment cards issued by the plurality of issuers;

calculate, by the DA module on the periodic basis, a long-term variable measuring total spending amounts for each account number of the plurality of account numbers over a predefined period of time, wherein amounts associated with a first group of the completed transactions are weighed more heavily than amounts associated with a second group of the completed transactions in calculating the long-term variable, and wherein the first group of the completed transactions were completed more recently than the second group of the completed transactions;

identify, by the DA module on the periodic basis, a set of account numbers of the plurality of account numbers for which the long-term variable is within a top percentile;

transmit, by the DA module on the periodic basis, a list of the first set of account numbers to the AM module;

store, by the AM module within the memory device, the set of account numbers in an account file designated to receive stand-in authorization by the SPA computing device, thereby enrolling the set of account numbers in a premium cardholder service;

automatically set, by the AM module, a predefined purge date for each account number of the set of account numbers, the predefined purge date being a predefined time period after addition of the account number to the account file;

automatically purge, by the AM module from the account file, at least one of the set of account numbers in response to arrival of the corresponding predefined purge date, thereby unenrolling the at least one of the set of account numbers from the premium cardholder service;

receive, by the AM module from the payment interchange network, a plurality of authorization request data signals redirected by the payment interchange network to the SPA computing device after the plurality of authorization request data signals have been submitted to an issuing bank computing device that was unresponsive to the plurality of authorization request data signals, the issuing bank computing device associated with an issuer of the plurality of issuers, each of the plurality of authorization request data signals including an authorization request data for a current transaction initiated using a payment card associated with a candidate account number;

compare, by the AM module, the set of account numbers stored in the account file to each of the candidate account numbers included in the plurality of authorization request data signals;

in response to matching a first candidate account number included in one of the plurality of authorization request data signals to one of the set of account numbers stored in the account file, generate, by the AM module, a first authorization response data signal authorizing a first current transaction associated with the first candidate account number;

in response to a failure to match a second candidate account number included in one of the plurality of authorization request data signals to one of the set of account numbers stored in the account file, generate, by the AM module, a second authorization response data signal declining a second current transaction associated with the second candidate account number; and transmit, by the AM module while the issuing bank computing device is unresponsive, the first authorization response data signal and the second authorization response data signal via the payment interchange network to at least one of at least one acquiring bank computing device and at least one merchant computing device, wherein the first authorization response data signal causes the at least one merchant computing device to authorize the first current transaction, and wherein the second authorization response data signal causes the at least one merchant computing device to decline the second current transaction.

6. The system of claim 5 further configured to:
rank, by the DA module on the periodic basis, the plurality of account numbers by a value of the long-term variable to identify the top percentile.

7. The system of claim 5, wherein each of the plurality of authorization request data signals includes a monetary amount for the first current transaction, said SPA computing device further configured to:
store, in the account file, a transaction limit amount associated with each account number of the set of account numbers;
retrieve, from the account file, a transaction limit amount associated with the first candidate account number;
compare, by the AM module, the monetary amount with the transaction limit amount; and
generate, by the AM module, the first authorization response data signal to authorize the first current transaction further in response to the monetary amount being equal to or less than the transaction limit amount.

8. The system of claim 5, said SPA computing device further configured to:
generate, by the AM module, a response code indicating a reason for authorizing of the first current transaction by the SPA computing device; and
transmit, by the AM module, the response code to the payment interchange network with the first authorization response data signal.

9. At least one non-transitory computer-readable storage medium having computer-executable instructions embodied thereon, wherein executed by a stand-in payment authorization (SPA) computing device having at least one processor coupled to a memory and in communication with a payment interchange network and a plurality of issuers, the computer-executable instructions cause the at least one processor to:
execute an account management (AM) module and a data analyzer (DA) module coupled to the AM module;
retrieve, by the DA module on a periodic basis from a data warehouse, transaction data from completed transactions previously processed over the payment interchange network, the transaction data including a plurality of account numbers for payment cards issued by the plurality of issuers;
calculate, by the DA module on the periodic basis, a long-term variable measuring total spending amounts for each account number of the plurality of account numbers over a predefined period of time, wherein amounts associated with a first group of the completed transactions are weighed more heavily than amounts associated with a second group of the completed transactions in calculating the long-term variable, and wherein the first group of the completed transactions were completed more recently than the second group of the completed transactions;

identify, by the DA module on the periodic basis, a set of account numbers of the plurality of account numbers for which the long-term variable is within a top percentile;

transmit, by the DA module on the periodic basis, a list of the set of account numbers to the AM module;

store, by the AM module within a memory, the set of account numbers in an account file designated to receive stand-in authorization by the SPA computing device, thereby enrolling the set of account numbers in a premium cardholder service;

automatically set, by the AM module, a predefined purge date for each account number of the set of account numbers, the predefined purge date being a predefined time period after addition of the account number to the account file;

automatically purge, by the AM module from the account file, at least one of the set of account numbers in response to arrival of the corresponding predefined purge date, thereby unenrolling the at least one of the set of account numbers from the premium cardholder service;

receive, by the AM module from the payment interchange network, a plurality of authorization request data signals redirected by the payment interchange network to the SPA computing device after the plurality of authorization request data signals have been submitted to an issuing bank computing device that was unresponsive to the plurality of authorization request data signals, the issuing bank computing device associated with an issuer of the plurality of issuers, the plurality of authorization request data signals including an authorization request data for a current transaction initiated using a payment card associated with a candidate account number;

compare, by the AM module, the set of account numbers stored in the account file to each of the candidate account numbers included in the plurality of authorization request data signals;

in response to matching a first candidate account number included in one of the plurality of authorization request data signals to one of the set of account numbers stored in the account file, generate, by the AM module, a first authorization response data signal authorizing a first current transaction associated with the first candidate account number;

in response to a failure to match a second candidate account number included in one of the plurality of authorization request data signals to one of the set of account numbers stored in the account file, generate, by the AM module, a second authorization response data signal declining a second current transaction associated with the second candidate account number; and transmit, by the AM module while the issuing bank computing device is unresponsive, the first authorization response data signal and the second authorization response data signal via the payment interchange network to at least one of at least one acquiring bank computing device and at least one merchant computing device, wherein the first authorization response data signal causes the at least one merchant computing device to authorize the first current transaction, and wherein the second authorization response data signal causes the at least one merchant computing device to decline the second current transaction.

10. The at least one non-transitory computer-readable storage medium of claim 9, wherein the computer-executable instructions further cause the at least one processor to:
rank, by the DA module on the periodic basis, the plurality of account numbers by a value of the long-term variable to identify the top percentile.

11. The at least one non-transitory computer-readable storage medium of claim 9, wherein each of the plurality of authorization request data signals includes a monetary amount for the first current transaction, wherein the computer-executable instructions further cause the at least one processor to:
store, in the account file, a transaction limit amount associated with each account number of the set of account numbers;
retrieve, from the account file, a transaction limit amount associated with the first candidate account number;
compare, by the AM module, the monetary amount with the transaction limit amount; and
generate, by the AM module, the first authorization response data signal to authorize the first current transaction further in response to the monetary amount being equal to or less than the transaction limit amount.

12. The at least one non-transitory computer-readable storage medium of claim 9, wherein the computer-executable instructions further cause the at least one processor to:
generate, by the AM module, a response code indicating a reason for authorizing of the first current transaction by the SPA computing device; and
transmit, by the AM module, the response code to the payment interchange network with the first authorization response data signal.

\* \* \* \* \*